US012742306B2

(12) United States Patent
Dengg et al.

(10) Patent No.: US 12,742,306 B2
(45) Date of Patent: Sep. 22, 2026

(54) WORKING MACHINE

(71) Applicant: Liebherr-Werk Bischofshofen GmbH, Bischofshofen (AT)

(72) Inventors: Reinhard Dengg, Tamsweg (AT); Gerald Heugenhauser, Goldegg (AT); Hans Knapp, Bischofshofen (AT); Matthias Oebster, Flachau (AT)

(73) Assignee: LIEBHERR-WERK BISCHOFSHOFEN GMBH, Bischofshofen (AT)

( * ) Notice: Subject to any disclaimer, the term of this patent is extended or adjusted under 35 U.S.C. 154(b) by 339 days.

(21) Appl. No.: 18/429,223

(22) Filed: Jan. 31, 2024

(65) Prior Publication Data

US 2024/0328112 A1 Oct. 3, 2024

(30) Foreign Application Priority Data

Mar. 30, 2023 (DE) ..................... 10 2023 108 174.8

(51) Int. Cl.

*E02F 9/08* (2006.01)
*B60K 15/07* (2006.01)
*B60K 15/03* (2006.01)
*E02F 3/34* (2006.01)

(52) U.S. Cl.

CPC ............ *E02F 9/0883* (2013.01); *B60K 15/07* (2013.01); *E02F 9/0875* (2013.01); *B60K 2015/03256* (2013.01); *B60K 2015/03315* (2013.01); *E02F 3/3417* (2013.01)

(58) Field of Classification Search

CPC ..... E02F 9/0883; E02F 9/0875; E02F 3/3417; B60K 15/07; B60K 2015/03256; B60K 2015/03315; B60K 2015/0675; B60K 15/067; B60K 15/073

See application file for complete search history.

(56) References Cited

U.S. PATENT DOCUMENTS 9,809,113 B2 11/2017 Shipp et al.
2002/0121772 A1 9/2002 Koster
2008/0111048 A1 5/2008 Jang
2012/0080466 A1* 4/2012 Schultheis ............ F17C 13/084 224/400

(Continued)

FOREIGN PATENT DOCUMENTS

DE 10102636 A1 8/2002
DE 102010050989 A1 6/2011

(Continued)

*Primary Examiner* — Syed O Hasan

(74) *Attorney, Agent, or Firm* — McCoy Russell LLP

(57) ABSTRACT

The present disclosure relates to a working machine which comprises a cabin for the operator of the working machine, an engine compartment arranged behind the cabin with a drive for the working machine, and at least one tank arranged behind the cabin for containing a fuel, in particular hydrogen. The working machine is characterized in that it has a displacement device on which the at least one tank is arranged within a mounting frame fastened to the working machine base body, wherein the displacement device is adapted to permit lateral displacement of the at least one tank if a force acting laterally on the at least one tank and/or the displacement device exceeds a preset threshold value.

18 Claims, 5 Drawing Sheets

(56) References Cited

U.S. PATENT DOCUMENTS

| | | | | |
|---|---|---|---|---|
| 2015/0035267 | A1 * | 2/2015 | Shipp | B60K 15/063 280/834 |
| 2020/0247234 | A1 | 8/2020 | Sawada | |
| 2023/0032196 | A1 | 2/2023 | Koehl et al. | |
| 2023/0311643 | A1 * | 10/2023 | Jackson | B60K 15/07 248/200 |

FOREIGN PATENT DOCUMENTS

| | | | | |
|---|---|---|---|---|
| DE | 102016217757 | A1 | 3/2018 | |
| DE | 102019202285 | A1 * | 8/2019 | B62D 21/02 |
| EP | 1380460 | A1 | 1/2004 | |
| EP | 4223942 | A1 | 8/2023 | |
| KR | 20220118212 | A | 8/2022 | |
| WO | 2022022855 | A1 | 2/2022 | |

* cited by examiner

WORKING MACHINE

CROSS REFERENCE TO RELATED APPLICATION

The present application claims priority to German Patent Application No. 10 2023 108 174.8 filed on Mar. 30, 2023. The entire contents of the above-listed application are hereby incorporated by reference for all purposes.

TECHNICAL FIELD

The present disclosure relates to a working machine, in particular a wheel loader, with a cabin for the operator of the working machine and with an engine compartment arranged behind the cabin.

BACKGROUND

It is known from the state of the art to design wheel loaders with a cabin for the operator of the working machine and with an engine compartment, wherein a diesel engine is located in the engine compartment, which serves to propel the working machine.

SUMMARY

In the course of decarbonization, the question of alternative energy sources, such as hydrogen, also arises in the field of working machines. Its use has not yet become established in either passenger or commercial vehicles.

The object underlying the present disclosure is to further develop a working machine of the type mentioned above in such a way that it is particularly suitable for the use of alternative energy sources, in particular hydrogen, and also meets the associated increased safety requirements.

This object is achieved by a working machine with the features as described herein.

Accordingly, a working machine is provided which comprises a cabin for the operator of the working machine, an engine compartment arranged behind the cabin with a drive for the working machine, and at least one tank arranged behind the cabin for containing a fuel, in particular hydrogen. The working machine is characterized in that it comprises a displacement device 10 on which the at least one tank is arranged within a mounting frame fastened to the working machine base body, wherein the displacement device 10 is adapted to permit a lateral displacement of the at least one tank if a force acting laterally on the at least one tank and/or the displacement device 10 exceeds a threshold value.

If, for example, the working machine tips over to the side, there is a risk that the at least one tank will suffer structural damage and that the fuel, e.g. hydrogen, contained in it will flow out.

In order to prevent structural damage to the at least one tank, it is provided according to the disclosure, that when the working machine is tilted to the side, the tank can perform an evasive movement with the aid of the displacement device 10, which protects it from excessive force effects and leads to the structural integrity of the tank being maintained.

Thus, the working machine according to the disclosure has a displacement device 10 which, when a lateral force is applied to the at least one tank, allows the tank to be displaced in the direction of the application of force, so that, for example, when the working machine is tilted to the side, the at least one tank is displaced accordingly and the application of force acts primarily on other components of the working machine, in particular the driver's cab or the like. As a result, the probability of structural damage to the at least one tank is reduced, so that the overall risk of fuel leakage, which is particularly significant in the case of hydrogen, is reduced.

According to a further development of the disclosure, it may further be provided that the displacement device 10 is adapted to permit a displacement of the at least one tank in that lateral direction in which the laterally acting force urges the displacement device 10. If, for example, the working machine tips over to the side and the at least one tank is the first to come into contact with the ground, this does not lead to the entire force acting on the at least one tank, but initially to the displacement means permitting a displacement of the at least one tank when a force threshold value is exceeded, so that the force occurring during tipping can be dissipated by other components of the working machine, for example the driver's cab or the engine compartment, and structural damage to the at least one tank does not occur. Even if the driver's cab allows significant deformation in the direction of force due to the application of a lateral force for the purpose of energy absorption as a result of the normative requirements, the displacement means ensures that the at least one tank can follow the deformation of the driver's cab through its evasive movement.

Furthermore, according to the present disclosure, it may be provided that the displacement device 10 is arranged within the mounting frame which at least partially surrounds the at least one tank for its protection and the displacement device 10 has a retaining structure so that the at least one tank cannot detach from the displacement device 10 and can only perform the lateral movement specified by the displacement device 10.

The mounting frame is connected to the machine base and also serves to ensure that the at least one tank cannot detach from the working machine in an uncontrolled manner. This prevents a tank from being jammed between the ground and the working machine in the event of the working machine tipping or rolling over, resulting in uncontrolled leakage of fuel from the at least one tank.

According to an optional development of the present disclosure, it may be provided that the displacement device 10 is adapted to permit a lateral displacement of the at least one tank to such an extent that the tank steps back behind the driver's cab when viewed in the lateral direction.

This is advantageous for absorbing the force exerted by the driver's cab when the working machine tips over, so that as little force as possible is exerted on the at least one tank.

For example, it may be provided that the dimension of the at least one tank, viewed in the transverse direction, projects beyond the dimension of the driver's cab, viewed in the transverse direction, so that it is advantageous for the disclosure if the at least one tank can be displaced laterally with the aid of the displacement device 10 to such an extent that it can step back to one side behind the driver's cab, so that the driver's cab can absorb and dissipate a force acting from the side.

Furthermore, according to the disclosure, it may be provided that the displacement device 10 has a rail system 11 via which the at least one tank is linked to the mounting frame on a working machine base body, wherein the rail system 11 is preferably oriented laterally, in particular transversely to the direction of travel of the working machine, and permits a corresponding movement transversely to the working machine base body. The rail system 11 can be designed in such a way that only a movement transverse to the working machine base body is possible. The rail system 11 is depicted schematically in FIGS. 1 and 4.

Alternatively and non-limiting, the function of the displacement device 10 can also be ensured by the retaining structure of the tank itself, for example by designing the retaining structure in the form of clamping collars 13 which hold the tank in position during normal operation and allow it to deflect in the direction of the force when an increased lateral force is applied, which is particularly suitable if the tank is designed as a cylindrical container.

According to an optional modification of the present disclosure, it may be provided that the displacement device 10 is adapted to permit only a movement in the lateral direction and in particular to suppress a movement perpendicular thereto, preferably a movement in the forward or rearward direction or in the vertical direction of the working machine.

Furthermore, according to the present disclosure, it may be provided that the displacement device 10 has a locking mechanism 12 which only permits lateral movement of the at least one tank when the force acting laterally on the at least one tank and/or the displacement device 10 exceeds the preset threshold value.

The mounting frame surrounding the displacement means is designed to enable the lateral deflection of the at least one container and to remain connected to the working machine base body despite any deformation due to the application of force, thereby ensuring the function of a tear-out protection for the tank or the tank assembly.

According to an advantageous development of the present disclosure, it may be provided that the at least one tank is provided with a solenoid valve 14 for closing or opening the at least one tank and, if required, establishing or interrupting a fluidic connection to the engine compartment via a fuel line 15.

Accordingly, it can be provided that the fuel contained in the at least one tank is used to drive the working machine or one of its components. The drive of the working machine is typically located in the engine compartment of the working machine, so that a fuel line 15 is required to flow the fuel located in the at least one tank to the engine compartment. To create and/or close a fluidic connection between the engine compartment and the at least one tank, a solenoid valve 14 can be provided, which can be switched between an open and a closed position.

It can be advantageous if the solenoid valve 14 of the at least one tank shifts to the closed position or remains there in the de-energized state.

Thus, according to the disclosure, it may be provided that an electric supply line is provided for supplying the solenoid valve 14 of the at least one tank, which is physically separated by a lateral shift of the displacement device 10.

Therefore, if the lateral force acting on the at least one tank is actually so great that the displacement device 10 allows lateral displacement because the threshold value of the lateral force has been exceeded, the supply line for supplying the solenoid valve 14 (or the multiple solenoid valves if there are multiple tanks) is interrupted, so that the solenoid valve 14 is transferred to the de-energized state in which it closes the associated tank.

As a result, the possibility of fuel flowing out of at least one tank via a fuel line damaged by the deformation is prevented.

Furthermore, according to the present disclosure, it may be provided that the working machine further comprises a control unit 16 which is adapted to determine a longitudinal or transverse inclination of the working machine with the aid of at least one sensor 17 and to close the solenoid valve 14 of the at least one tank when a preset limit value of the longitudinal and/or transverse inclination is exceeded, preferably by de-energizing the valve.

The control unit 16 can therefore ensure that the at least one tank is closed with the aid of its associated solenoid valve 14 even before the working machine actually tilts, even though the at least one tank has not yet been displaced with the aid of the displacement device.

To determine whether the at least one tank should be closed using its solenoid valve 14, the control unit 16 uses at least one sensor 17 which, for example, provides information about the position of the working machine in relation to the roll angle or the tilt angle. Based on the sensor values obtained in this way, the control unit 16 then determines the probability of a tipping of the working machine, so that the at least one tank is closed when a predefined threshold value is exceeded.

A further optional embodiment of the disclosure can comprise a control unit 16 with at least one sensor 17 which detects the displacement of the at least one tank and in this case can close the solenoid valve 14 of the at least one tank, preferably by de-energizing the valve.

In this case, the control unit 16 can ensure that the at least one tank is closed using its associated solenoid valve 14, for example when bumping into the wheel loader from the side.

According to a further optional modification of the present disclosure, it may be provided that the at least one tank is arranged between the cabin and the rear of the working machine in a hydrogen fuel system, in particular wherein the tank is arranged directly behind the cabin and/or the tank is not arranged above the engine compartment.

Furthermore, according to the present disclosure, it may be provided that the dimensions of the at least one tank in the transverse direction of the working machine project beyond the dimensions of the driver's cab in the transverse direction and/or wherein the at least one tank is arranged behind the cabin in a recess.

According to the disclosure, it may also be provided that the drive has a fuel cell for generating electric energy by means of hydrogen and/or has a hydrogen reciprocating piston engine, the fuel for this being stored in the at least one tank.

According to an optional embodiment of the disclosure, it may be provided that a plurality of tanks for containing a fuel, in particular hydrogen, is provided, wherein each of the multiple tanks has a respective solenoid valve 14 for closing or opening the corresponding tank.

Further details, features and advantages of the disclosure will become apparent from the following drawings, which illustrate an embodiment of the present disclosure.

DETAILED DESCRIPTION

Figure 1:
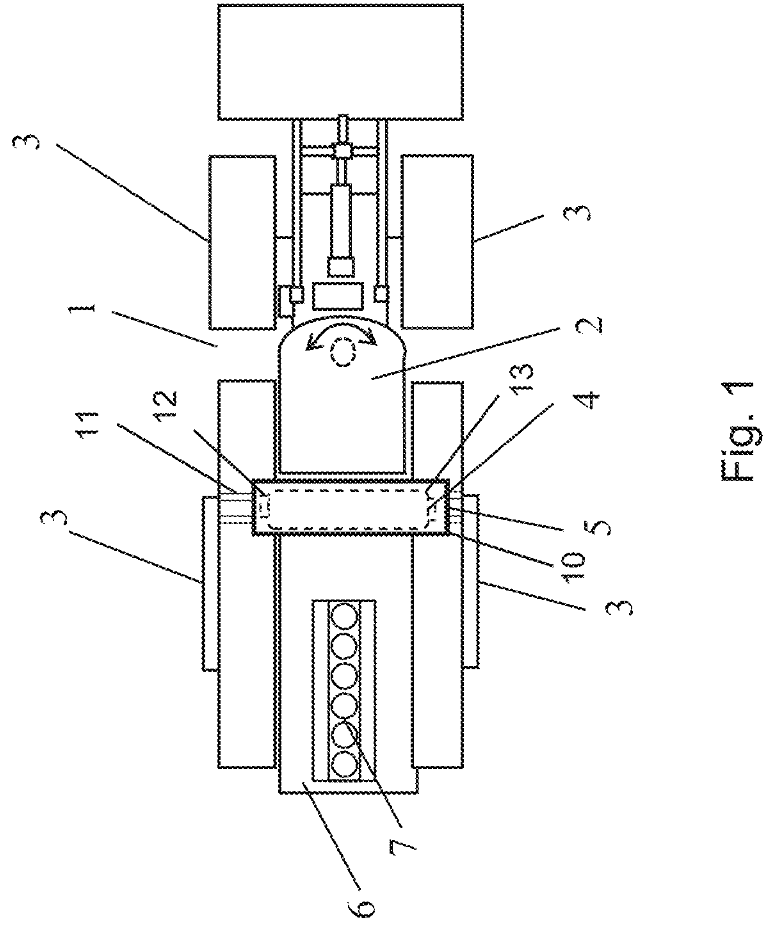
FIG. 1: a schematic top view of the wheel loader.

FIG. 1 shows a top view of the wheel loader 1 according to the disclosure. The wheel loader 1 has a front carriage and a rear carriage, which are connected to each other by an articulated joint. The double arrow around the dashed articulated joint illustrates the movability of the front and rear carriage relative to each other.

The cabin for the operator of the wheel loader is denoted by reference character 2. The cabin is arranged on the rear carriage. Directly behind the cabin 2 is a tank 4 arranged transversely to the direction of travel, which is preferably surrounded on all sides by a protective structure also arranged transversely to the direction of travel and by a mounting frame 5.

In the exemplary embodiment shown, the tank 4 and the mounting frame 5 extend beyond the cabin 2 on both sides.

Figure 2:
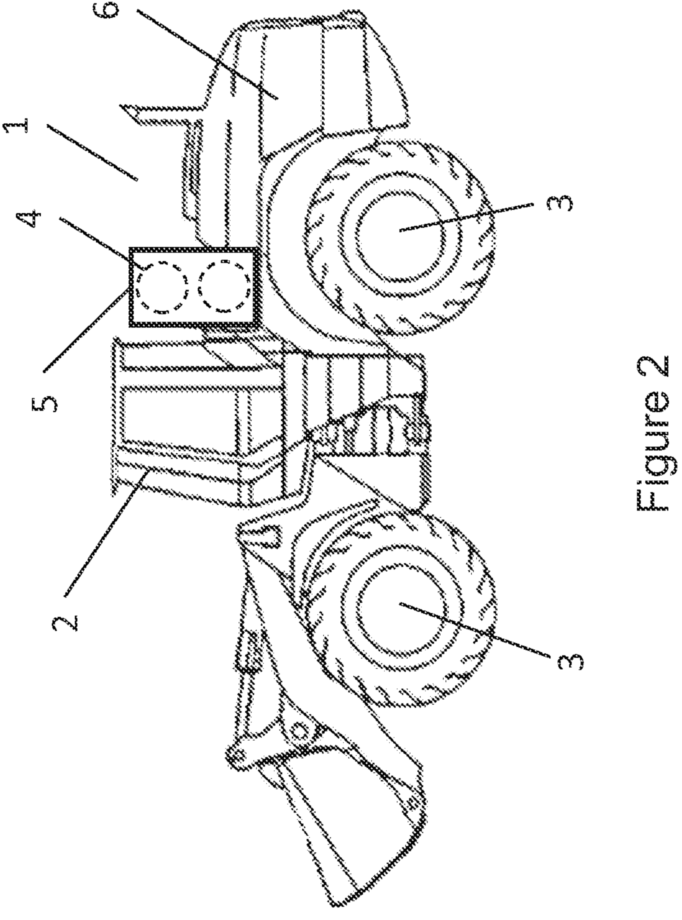
FIG. 2: a schematic side view of a wheel loader from the left.
Figure 3:
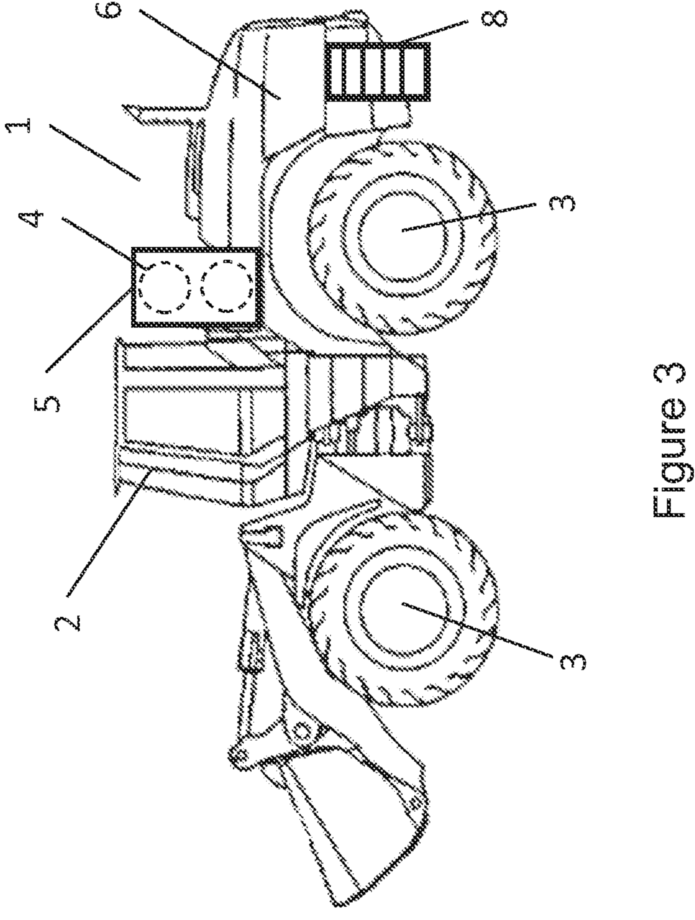
FIG. 3: a schematic side view of a wheel loader from the left with rear access.

As can be seen from the side views in FIGS. 2 and 3, the tank system extends essentially up to the cabin roof. It can have one, two or more than two tanks arranged one above the other and/or next to each other. The fuel stored in the tank 4 is supplied to the engine compartment 6, where it is then converted in a conversion unit 7 (e.g. hydrogen reciprocating engine or fuel cell).

The engine compartment 6 is located in the rear carriage of the wheel loader and contains, among other things, the drive technology of the wheel loader for driving the wheels 3 of the wheel loader 1. The drive can, for example, be a hydrogen reciprocating piston engine or a fuel cell that supplies an electric motor with electric energy.

Reference character 8 denoted the maintenance and service access to the engine compartment 6, which is preferably designed as a ladder or staircase, as shown in FIG. 3.

FIG. 2 shows the wheel loader according to FIG. 1 in a side view from the left and FIG. 3 shows the wheel loader according to FIG. 1 in a side view from the left with optional rear-side access.

It can be seen from the Figures that the tank or tank assembly is located directly behind the cabin 2. Between the cabin 2 and the engine compartment 6 is located a recess in which the tank assembly is arranged.

Figure 4:
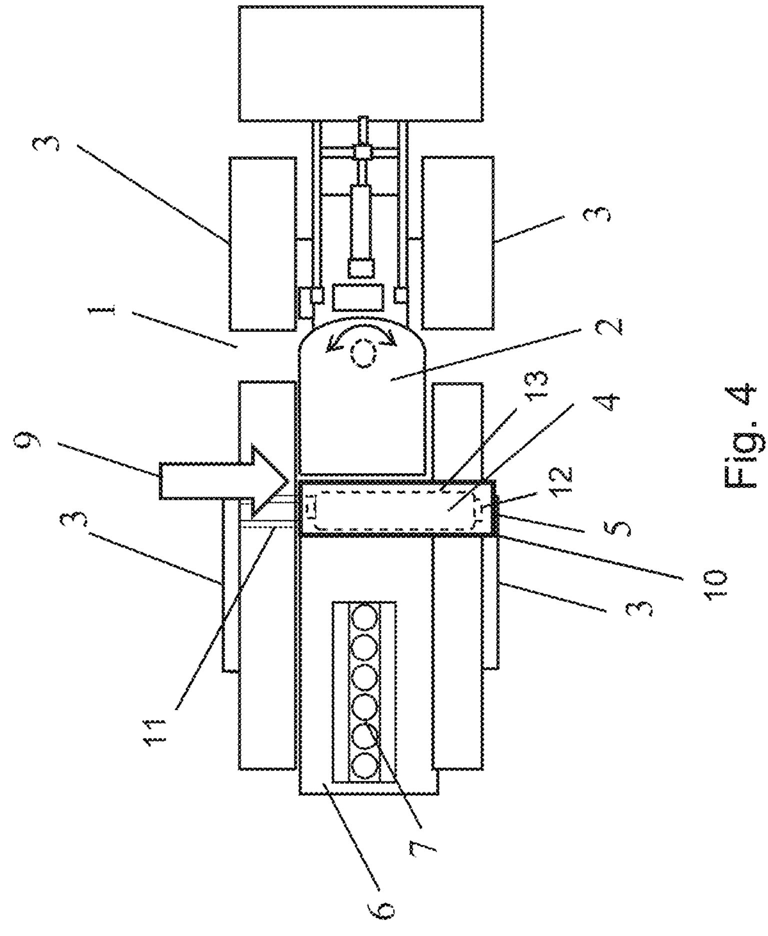
FIG. 4: A schematic top view of the loader, wherein a lateral force causes the displacement of the at least one tank.
Figure 5:
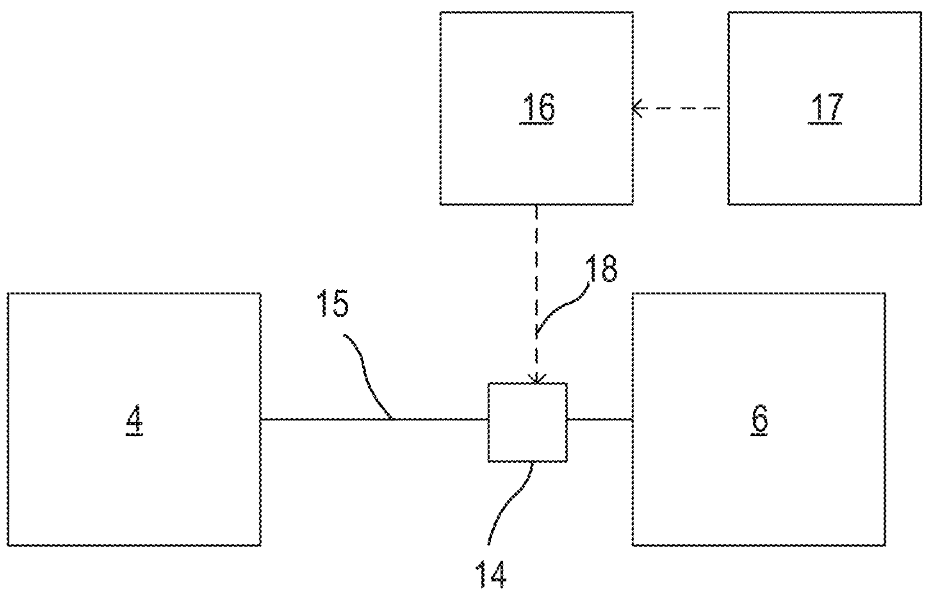
FIG. 5: A schematic representation of an embodiment of the wheel loader.

FIG. 4 again shows a top view of the wheel loader 1, in which reference character 9 now shows a lateral application of force which has led to a displacement of the at least one tank 4 with the aid of the displacement device 10. In comparison to FIG. 1, it can be seen that the position of the at least one tank 4 is shifted in the direction of the application of force 9, so that the application of force 9 now no longer primarily acts on the structure of the at least one tank 4 (or the retaining structure surrounding the tank 4 or on the surrounding mounting frame), but can also be dissipated by the driver's cab 2 or the engine compartment 6. This means that the force 9 can no longer act primarily on the at least one tank 4 or the mounting frame, but can also act on other structural components of the working machine as a result of the displacement.

As a result, structural damage due to the load case of the lateral force of the at least one tank 4 can thus be mitigated, so that the safety of the working machine and the machine operator can be ensured.

The invention claimed is:

1. Working machine, comprising:

a cabin for the operator of the working machine, an engine compartment arranged behind the cabin, with a drive for the working machine, at least one tank arranged behind the cabin for containing fuel, and comprising a displacement device, on which the at least one tank is arranged within a mounting frame fastened to the working machine base body, wherein the displacement device is adapted to permit lateral displacement of the at least one tank if a force acting laterally on the at least one tank and/or the displacement device exceeds a threshold value, wherein the laterally acting force urges the displacement device, wherein the displacement device comprises a rail system via which the at least one tank is linked to the mounting frame, wherein the displacement device including the rail system is oriented laterally, wherein the at least one tank is provided with a solenoid valve for closing or opening the at least one tank, wherein the at least one tank is arranged between the cabin and the rear of the working machine in a hydrogen fuel system, further comprising a control unit adapted to close the solenoid valve of the at least one tank by means of at least one sensor which detects the displacement of the at least one tank, and wherein the working machine is a wheel loader.

2. Working machine according to claim 1, wherein the displacement device has a retaining structure in the form of clamping collars, which surrounds the at least one tank, in which the at least one tank cannot detach from the displacement device and can only perform the movement specified by the displacement device.

3. Working machine according claim 1, wherein the displacement device is adapted to permit lateral displacement of the at least one tank in which the latter moves behind the driver's cab when viewed in the lateral direction.

4. Working machine according to claim 1, wherein the displacement device including the rail system is oriented transversely to the direction of travel of the working machine and permits a corresponding movement transversely to the working machine base body.

5. Working machine according to claim 2, wherein the at least one tank is linked to the mounting frame via the clamping collars, wherein the displacement device comprising the clamping collars is oriented laterally, and transversely to the direction of travel of the working machine and permits a corresponding movement transversely to the working machine base body.

6. Working machine according to claim 1, wherein the displacement device is adapted to permit movement in the lateral direction only and suppresses movement perpendicular thereto, wherein the displacement device suppresses movement in the forward or rearward direction or in the vertical direction of the working machine.

7. Working machine according to claim 1, wherein the displacement device is surrounded by the mounting frame, which is designed to enable lateral deflection of the at least one tank and which remains connected to the working machine base body despite deformation due to a lateral force effect, and which assumes the function of a tear-out protection for the at least one tank connected to the displacement device.

8. Working machine according to claim 1, wherein the displacement device comprises a locking mechanism which only permits lateral movement of the at least one tank when the force acting laterally on the at least one tank and/or the displacement device exceeds the threshold value.

9. Working machine according to claim 1, wherein the solenoid valve is configured to establish or interrupt a fluidic connection to the engine compartment via a fuel line.

10. Working machine according to claim 9, wherein the solenoid valve of the at least one tank shifts to the closed position or remains there in the de-energized state.

11. Working machine according to claim 9, wherein an electric supply line is provided for supplying the solenoid valve of the at least one tank, which is physically separated by a lateral shift of the displacement device.

12. Working machine according to claim 1, wherein the tank is arranged directly behind the cabin and/or the tank is not arranged above the engine compartment.

13. Working machine according to claim 3, wherein dimensions of the at least one tank in the transverse direction of the working machine project beyond dimensions of the driver's cab in the transverse direction and/or wherein the at least one tank is arranged behind the cabin in a recess.

14. Working machine according to claim 1, wherein the drive comprises a fuel cell for generating electric energy by means of hydrogen and/or comprises a reciprocating piston hydrogen engine.

15. Working machine according to claim 1, wherein the at least one tank is a plurality of tanks, each of which has a solenoid valve for closing or opening a respective tank.

16. Working machine according to claim 9, wherein the control unit is adapted to close the solenoid valve of the at least one tank by de-energizing the valve.

17. Working machine according to claim 1, a wherein the control unit is adapted to determine a longitudinal or transverse inclination of the working machine using the at least one sensor, and to close the solenoid valve of the at least one tank by de-energizing the valve when a preset limit value of the longitudinal and/or transverse inclination is exceeded.

18. Working machine according to claim 1, wherein the fuel is hydrogen.

* * * * *